A. Hovey.
Horse Rake.
Nº 7084. Patented Feb. 12, 1850.
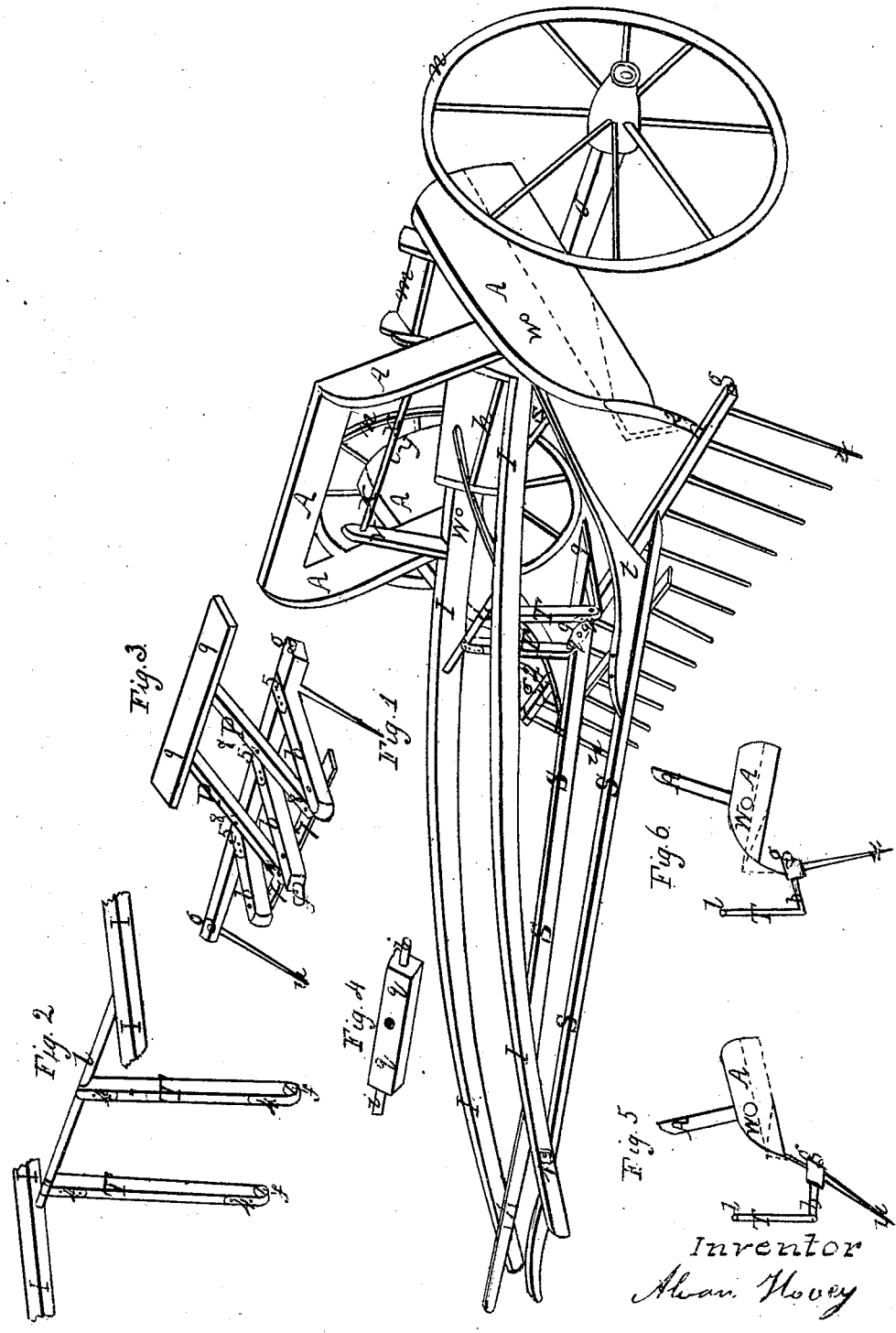
Inventor
Alvan Hovey

UNITED STATES PATENT OFFICE.

ALVAN HOVEY, OF BROOKFIELD, VERMONT.

IMPROVEMENT IN HORSE-RAKES.

Specification forming part of Letters Patent No. 7,084, dated February 12, 1850.

*To all whom it may concern:*

Be it known that I, ALVAN HOVEY, of Brookfield, in Orange county, and State of Vermont, have invented a new Mode of Attaching Wheels to a Horse-Rake, and of elevating the rake and clearing it from its windrow; and I hereby declare that the following is a full and correct description of the same, viz:

The wheels to be used, Figure 1, $n\,n$, may be the hind wheels of a common gig-wagon, or common chaise-wheels from four to five feet in diameter, with an axle of about five feet in length between shoulders. These wheels and axle are placed so far in the rear of the rake as to give room for clearing the rake from the windrow, ordinarily about four feet, according to the rake to which they are attached. They are attached to the rake by shafts or thills, Fig. 1, $s$, passing from the axle about one and a half foot above the rake-head, so as to leave sufficient room for raising and clearing the rake, and are attached to the shafts of the rake, on the outside of them, and about eight inches back of the ends of the shafts of the rake and made firm to them by bolts passing horizontally through both, Fig. 1, $l$. On the second axle, equidistant from the wheels, is fixed a suitable seat, Fig. 1, $m$, for the manager of the rake, with a foot-board at a proper distance below it, Fig. 1, Z, but so high from the ground as to clear the windrows over which it must pass.

For the purpose of raising the rake, turning the teeth back, and clearing them from the windrow, two vertical standards about three feet long, Fig. 1, A A, are fixed to the outside of the shafts to the carriage by horizontal bolts, Fig. 1, W, on which the tops of them can be moved back and forward, and are connected together at the top by a flat girt about four inches wide, Fig. 1, A, firmly screwed on or tenoned into said standards. On the outside of the lower end of each of these standards and at right angles with them is firmly attached an elevator four feet long, six inches wide, and one and a half inch thick, Fig. 1, A A, through the center of the length of which and one and a half inch from the lower edge the aforesaid bolts through the shafts and standards pass. The forward end of each of said elevators is slanted off from near said standards to near the upper edge, Fig. 1, A A, to be governed by the specifications and the dotted lines in the drawings, and connected by a strap of sufficient length and strength to the head of the rake, equidistant from the center, Fig. 1, Q Q, so that the manager of the rake, by pulling back with one hand the said girt and standards, will at the same time elevate the rake, turn the teeth back, and clear them from the windrow, and by pushing said girt forward instantly insert the teeth in the hay close forward of the windrow, while with the other hand he is directing the course of his horse.

For the purpose of bearing down the rake when necessary and pressing the teeth close to the ground, three reaches, the one twelve, the other two ten, inches long, are firmly attached by bands and rivets to the fore side of the rake-head, the longest in the center and the others about one foot distant, on either side, Fig. 3, $b\,b\,b$, across which, at the forward end, is attached, on the under side, a cross-bar, Fig. 3, 7 7. On the forward end of the central reach, which projects two inches forward of said cross-bar, is a round tenon, Fig. 3, $f$, on which is placed a flat roller with a round tenon at each end, Fig. 4, $q\,q$ and $l\,l$, from which tenons two perpendicular sweeps, Fig. 2, T T, pass to a cross-bar, Fig. 2, $l$, between the shafts of the carriage, to which they are attached by brass bands passing round said cross-bar and firmly fastened to said sweeps. Between the said reaches are fastened, on the head of the rake, two flat levers, Fig. 3, P P, fastened at the forward ends to said cross-bar, and the hinder ends extending back to the said foot-board and connected together by a footstool, Fig. 3, $q\,q$, three inches wide and two feet long, fastened on the upper side of said levers in such a manner that the manager, by putting his foot thereon, can instantly apply any part of his weight to bear down the rake.

For the purpose of suspending the rake in a state of elevation and carrying it from one lot to another without the teeth touching the ground, two short standards, Fig. 1, V V, about two feet long, are inserted in the shafts of the carriage about six inches forward of the vertical standards aforesaid, between which short standards, near their top, is fixed a roller of good timber, one inch in diameter, Fig. 1, X X, on the center of which is placed a wire hook, Fig. 1, Y, to which hook the rake, when elevated as before directed, may be instantly suspended by passing the lower end of said hook under the rod, Fig. 1, $h$, between the handles of the rake, and the rake may be thus carried to any distance without touching the ground with the same ease and speed that the manager would ride on his seat without the rake.

Among the benefits to be derived from this invention are these: It relieves the manager of the most fatiguing part of the labor of haymaking. To follow on foot a horse-rake and keep it snug to the ground, where the hay is thick, by bearing with the hands upon the handles of the rake and at the same time to jerk it by main strength once in twenty, thirty, or forty feet over the windrow, clear the teeth, and set it in again without loss of time, requires the exertion of all the powers of our most athletic men in prime of life, while with these improvements a boy twelve years old, or an old or lame man who has the use of his hands, can with perfect ease ride and with one hand govern the horse, and with the other, and even with the strength of a thumb and finger, raise and clear the rake, set it in again, and go on without the least loss of time, while at the same time he can by the levers bear down the rake with one foot without the least inconvenience.

What I claim as my invention, and desire to secure by Letters Patent, is—

1. The method of working the rake-head by means of the treadle $g$, in combination with the hand-bars $t\,t$ and the back piece, A, as described.

2. The attachment of stilts to the thills 1, in the manner and for the purpose described, all of which gearing being so arranged that a person on his seat may charge and discharge or suspend the rake-head at pleasure, as herein set forth.

ALVAN HOVEY.

Witnesses:
 WM. HEBARD,
 BURNAM MARTIN.